United States Patent
Lo et al.

(10) Patent No.: US 9,240,054 B1
(45) Date of Patent: Jan. 19, 2016

(54) METHOD FOR MONITORING WATER LEVEL OF A WATER BODY AND SYSTEM FOR IMPLEMENTING THE METHOD

(71) Applicant: National Applied Research Laboratories, Taipei (TW)

(72) Inventors: Shi-Wei Lo, Hsinchu (TW); Chien-Hao Tseng, Hsinchu (TW); Lun-Chi Chen, Hsinchu (TW); Jyh-Hong Wu, Taichung (TW); Fang-Pang Lin, Hsinchu (TW); Wei-Fuu Yang, Hsinchu (TW); Ming-Chang Shieh, Hsinchu (TW); Chun-Ming Su, Hsinchu (TW); Hui-Lin Chen, Hsinchu (TW)

(73) Assignee: National Applied Research Laboratories, Taipei (TW)

(*) Notice: Subject to any disclaimer, the term of this patent is extended or adjusted under 35 U.S.C. 154(b) by 0 days.

(21) Appl. No.: 14/455,493

(22) Filed: Aug. 8, 2014

(51) Int. Cl.
*G06K 9/00* (2006.01)
*G06T 7/60* (2006.01)

(52) U.S. Cl.
CPC ....... *G06T 7/602* (2013.01); *G06T 2207/10004* (2013.01); *G06T 2207/30192* (2013.01); *G06T 2210/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,841,884 A * | 11/1998 | Yamamoto | ........... | G01N 33/186 348/81 |
| 5,903,305 A * | 5/1999 | Yamamoto | ........... | G01N 33/186 210/739 |
| 6,098,029 A * | 8/2000 | Takagi | .................. | G01F 23/292 382/100 |
| 8,184,848 B2 * | 5/2012 | Wu | .......................... | G06K 9/00 382/100 |
| 2007/0242884 A1 * | 10/2007 | Dugan | ................. | G06K 9/0063 382/190 |
| 2010/0322462 A1 * | 12/2010 | Wu | .......................... | G06K 9/00 382/100 |
| 2012/0070071 A1 * | 3/2012 | Rankin | ............. | G06K 9/00805 382/154 |
| 2012/0249745 A1 * | 10/2012 | Gagel | ..................... | G06T 19/00 348/46 |
| 2013/0197807 A1 * | 8/2013 | Du | ......................... | G06Q 40/08 702/5 |
| 2015/0040816 A1 * | 2/2015 | O'Brien | ............. | G01F 23/0007 116/228 |
| 2015/0078123 A1 * | 3/2015 | Batcheller | .............. | G01S 17/89 367/7 |

* cited by examiner

*Primary Examiner* — Anand Bhatnagar
(74) *Attorney, Agent, or Firm* — Muncy, Geissler, Olds & Lowe, P.C.

(57) ABSTRACT

In a method for monitoring water level of a water body, a monitoring system is configured to: capture a current image that has a portion of the water body, and a remaining portion aside from the portion of the water body; process the current image into a processed image that includes a water body region corresponding to the portion of the water body, and a background region corresponding to the remaining portion of the current image; mark, on the processed image, a plurality of virtual alert points according to a predetermined water level of the water body; determine whether at least one of the virtual alert points is located within the water body region of the processed image; and generate a monitoring result according to the determination thus made.

13 Claims, 6 Drawing Sheets

METHOD FOR MONITORING WATER LEVEL OF A WATER BODY AND SYSTEM FOR IMPLEMENTING THE METHOD

FIELD OF THE INVENTION

The invention relates to a method for monitoring water level of a water body, and a monitoring system configured to execute the method.

BACKGROUND OF THE INVENTION

Conventionally, there are a number of schemes available for monitoring water level of a water body (e.g., a river, a lake, etc.), in order to gain awareness of potential flooding in advance. For example, a commercially available water gauge may be placed directly in the water body to detect the water level. Alternatively, human observers may observe the water level in person or observe satellite images acquired by a satellite.

There are some drawbacks associated with the conventional schemes for monitoring the water level. For example, the water gauge has the risk of being flushed away by flooding, and may not be controllable afterward. Using human observers may be costly, and the observed result may not be objective. Using the satellite image may have accuracy issues due to the large area covered by the satellite image.

SUMMARY OF THE INVENTION

Therefore, an object of the present invention is to provide a method for monitoring a water level of a water body that is relatively simple and accurate.

Accordingly, a method for monitoring water level of a water body is to be implemented using a monitoring system that includes an image capturing module and an image processing module. The method includes the following steps of:

(a) capturing, using the image capturing module, a current image that has a portion of the water body and a remaining portion aside from the portion of the water body;

(b) processing, by the image processing module, the current image into a processed image that includes a water body region corresponding to the portion of the water body, and a background region corresponding to the remaining portion of the current image;

(c) marking on the processed image, by the image processing module, a plurality of virtual alert points according to a predetermined water level of the water body;

(d) determining, by the image processing module, whether at least one of the virtual alert points is located within the water body region of the processed image; and (e) generating, by the image processing module, a monitoring result according to the determination made in step (d).

Another object of the present invention is to provide a monitoring system that is configured to implement the above-mentioned method of this invention.

Accordingly, a monitoring system is for monitoring water level of a water body, and includes an image capturing module and an image processing module.

The image capturing module is for capturing a current image. The current image has a portion of the water body, and a remaining portion aside from the portion of the water body.

The image processing module is coupled to the image capturing module and is configured to:

process the current image into a processed image that includes a water body region corresponding to the portion of the water body and a background region corresponding to the remaining portion of the current image, mark, on the processed image, a plurality of virtual alert points according to a predetermined water level of the water body, determine whether at least one of the virtual alert points is located within the water body region of the processed image, and generate a monitoring result according to the determination thus made.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENT

Figure 1:
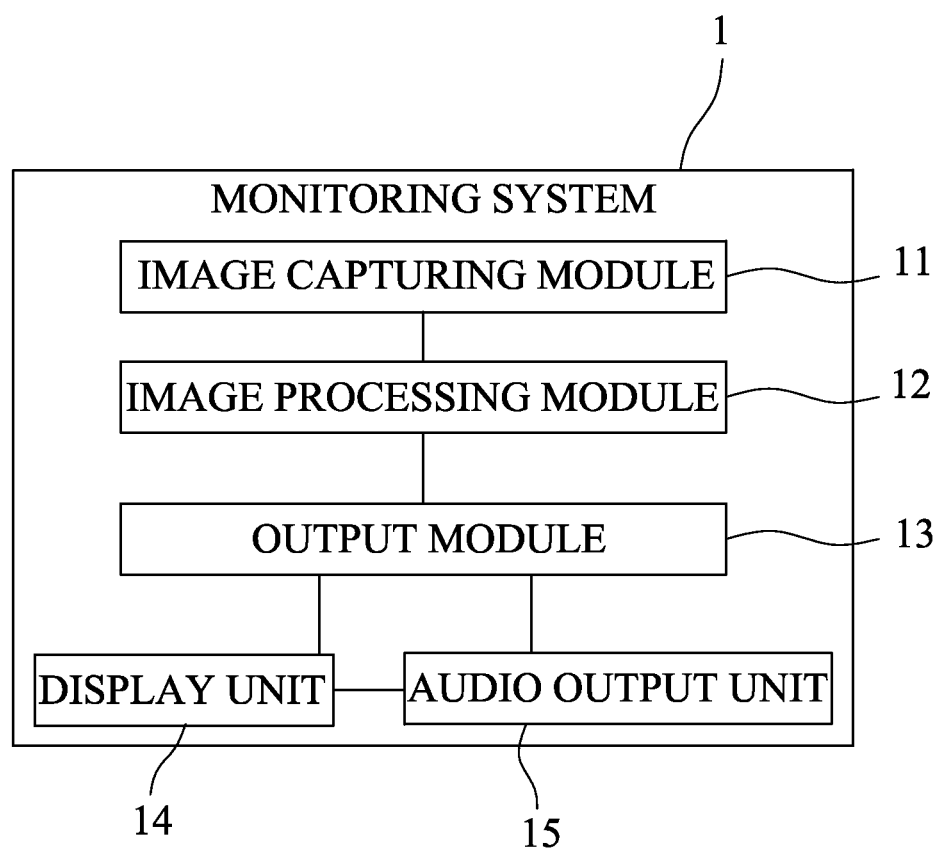
FIG. 1 is a block diagram of an embodiment of a monitoring system according to the present invention.

Referring to FIG. 1, an embodiment of a monitoring system 1 according to the present invention is for monitoring water level of a water body (e.g., a river, a lake, etc.). In this embodiment, the water body is a river.

The monitoring system 1 includes an image capturing module 11, an image processing module 12, an output module 13, a display unit 14 and an audio output unit 15.

Figure 3:
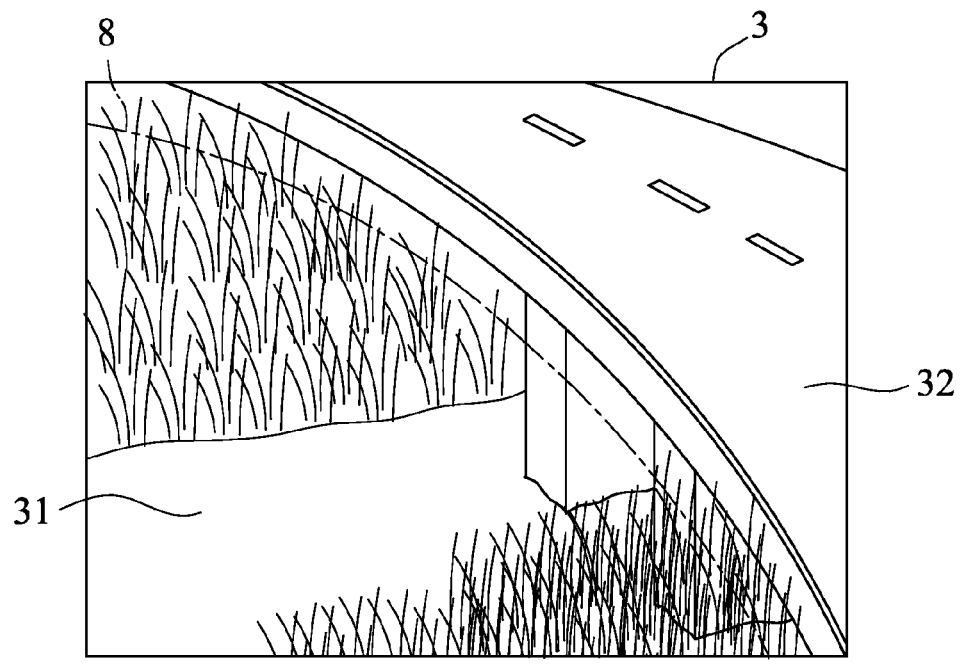
FIGS. 3 and 4 are exemplary current images captured using an image capturing module of the monitoring system of the embodiment.
Figure 4:
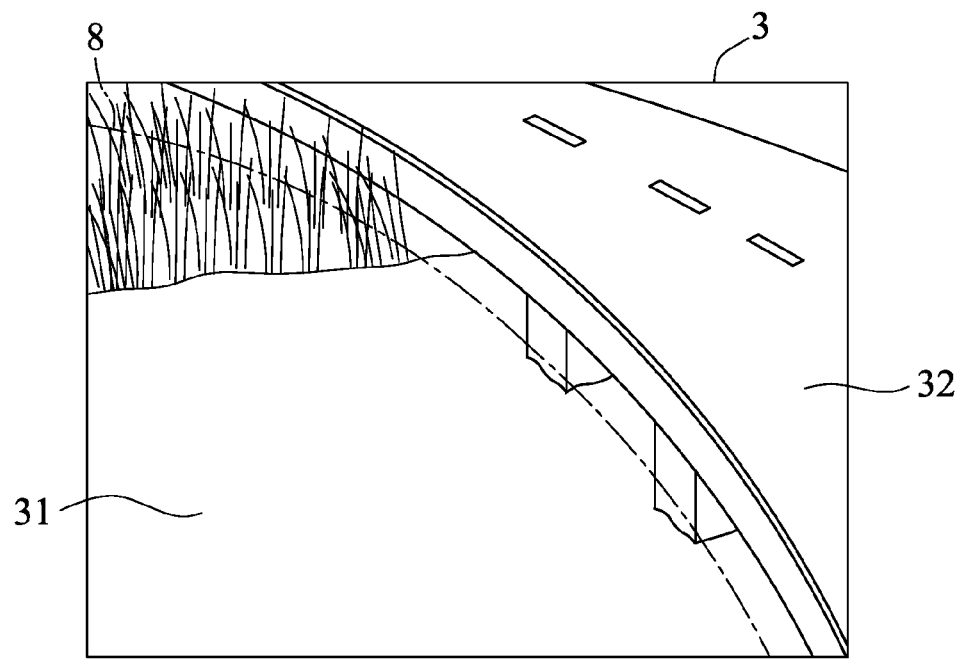

The image capturing module 11 is for capturing an image. In this embodiment, the image capturing module 11 is configured to capture a current image 3 of the river, as best shown in FIGS. 3 and 4.

The image processing module 12 is coupled to the image capturing module 11 for receiving the current image 3 of the river therefrom, and is configured to subject the current image 3 of the river to various processes. After processing the current image 3 of the river, the image processing module 12 is configured to generate a monitoring result and/or a warning signal associated with the water level of the river. The output module 13 is coupled to the image processing module 12 for receiving the monitoring result and/or the warning signal therefrom. The display unit 14 and the audio output unit 15 are coupled to the output module 13 and are configured to output signals received from the output module 13.

Figure 2:
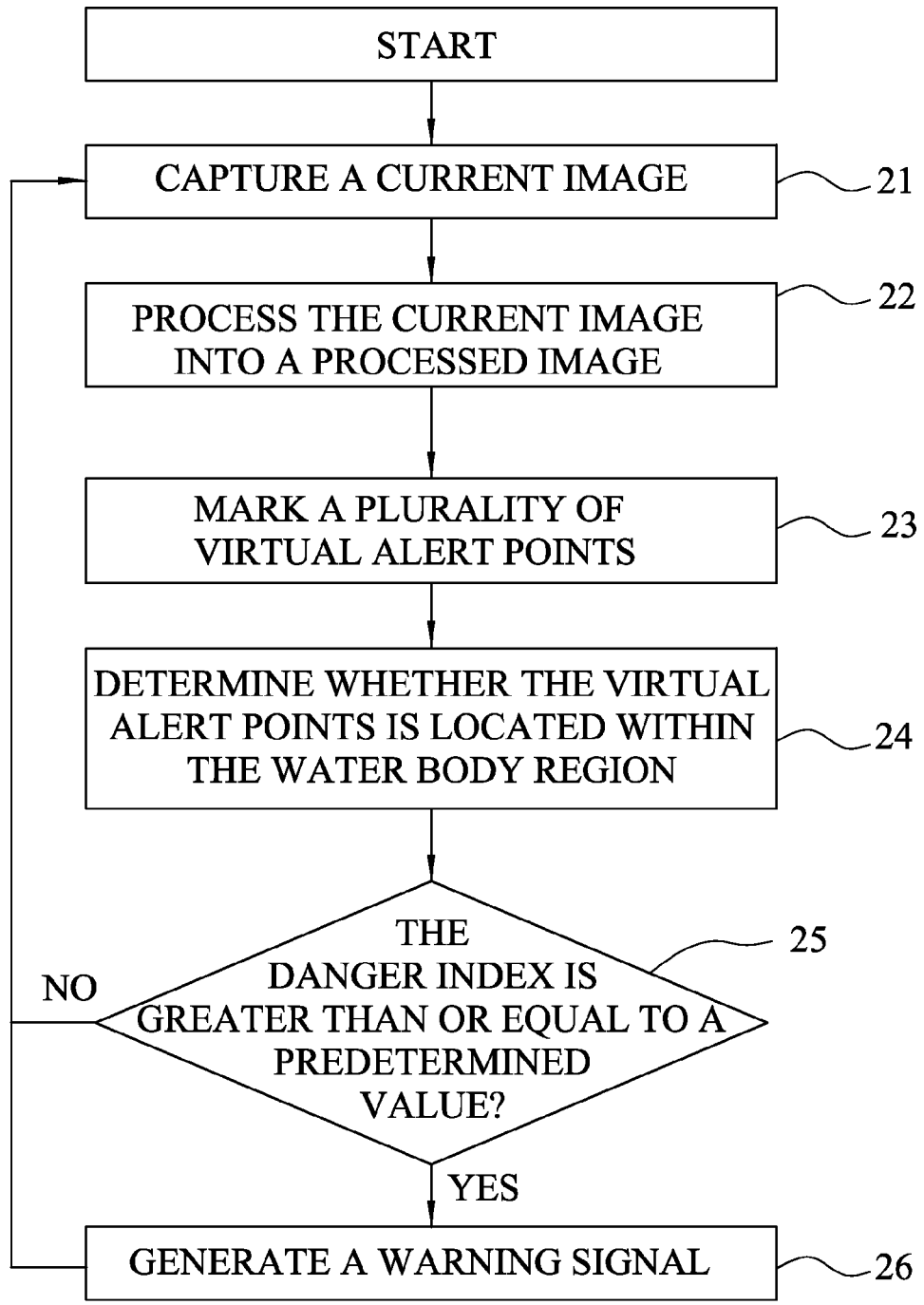
FIG. 2 is a flow chart of a method to be executed using the monitoring system, according to the present invention.

Further referring to FIG. 2, the monitoring system 1 of this invention is configured to execute a method for monitoring water level of the water body.

In this embodiment, the image capturing module 11 is disposed at a specific location near a river to capture a current image of the river. For example, FIGS. 3 and 4 respectively illustrate two current images captured by the image capturing module 11 that is installed near a bridge across the river.

In step 21, the image capturing module 11 captures a current image 3 of the river. The current image 3 of the river has a portion of the water body 31, and a remaining portion 32 aside from the portion of the water body 31. It can be seen from FIG. 4 that a larger portion of the water body 31 in the current image 3 may indicate that the river has a higher water level.

In step 22, the image processing module 12 receives and processes the current image 3 of the river. In particular, in this embodiment, the image processing module 12 processes the current image 3 into a processed image 3' that includes a water body region 6 corresponding to the portion of the water body 31, and a background region 7 corresponding to the remaining portion 32 of the current image 3.

Figure 7:
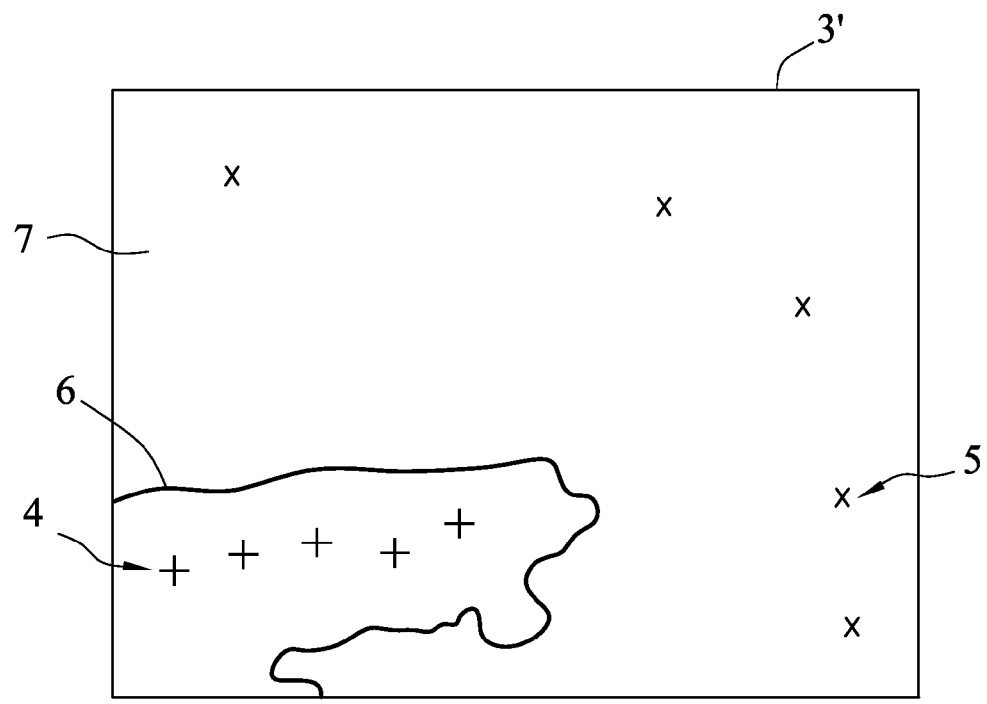
FIGS. 7 and 8 are exemplary processed images generated by an image processing module of the monitoring system of the embodiment.
Figure 8:
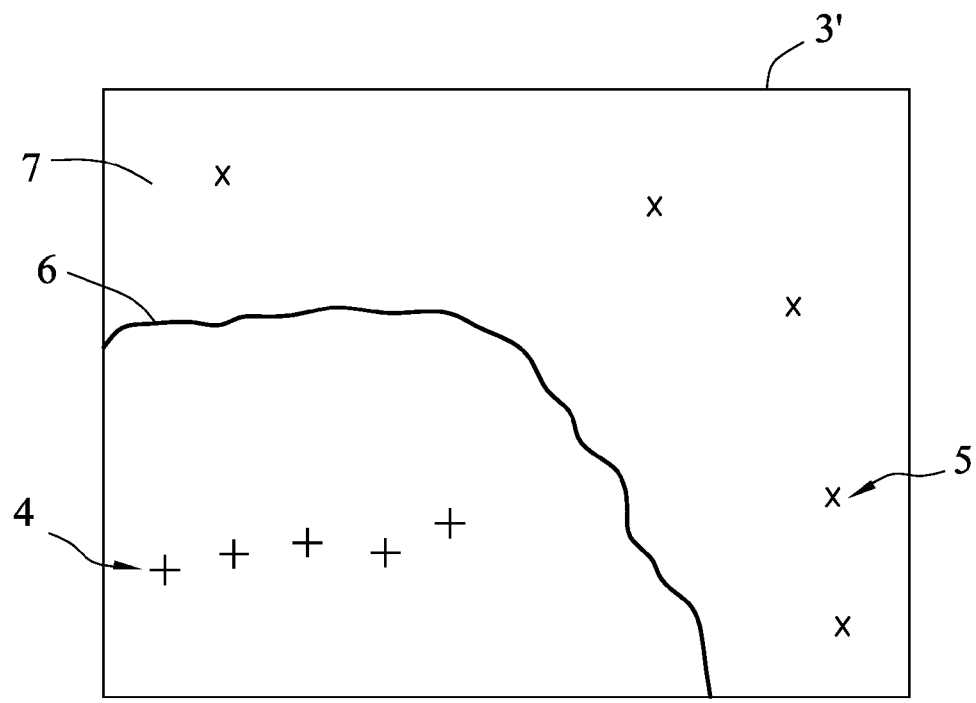

As an example, FIGS. 7 and 8 illustrate two processed images 3' that correspond respectively to the current images 3 of FIGS. 3 and 4.

Figure 5:
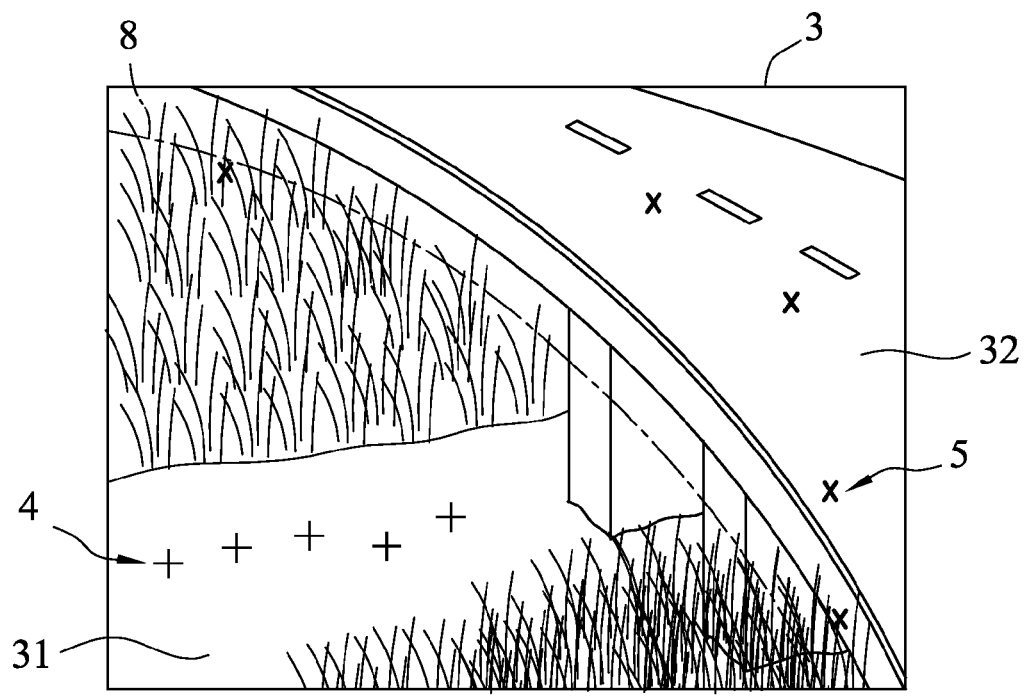
FIGS. 5 and 6 correspond to FIGS. 3 and 4, respectively, with a plurality of water body seed points and a plurality of background seed points added.
Figure 6:
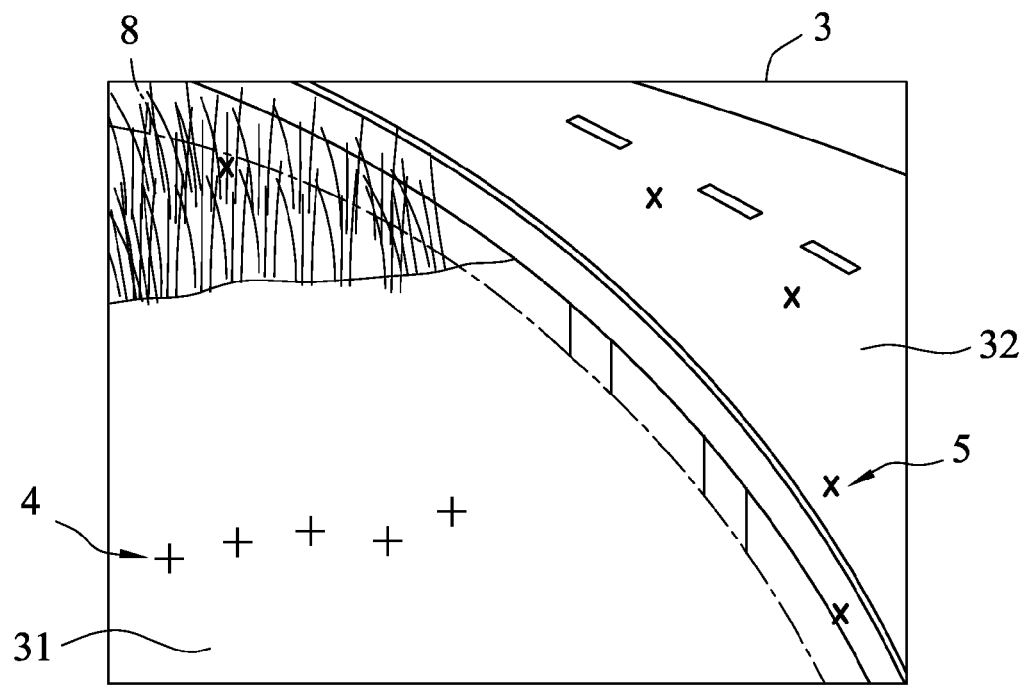

In this embodiment, an image segmentation method (for example, region growing) is used to process the current image 3 into the processed image 3'. First, the image processing module 12 selects, based on a set of predetermined criteria, a plurality of water body seed points 4 within the portion of the water body 31, and a plurality of background seed points 5 within the remaining portion 32 of the current image 3 (see FIGS. 5 and 6).

Afterward, the image processing module 12 is configured to classify the pixels in the current image 3 into one of the water body region 6 and the background region 7, based on the selected water body seed points 4 and the background seed points 5. The resulting processed images 3' are shown in FIGS. 7 and 8.

Figure 9:
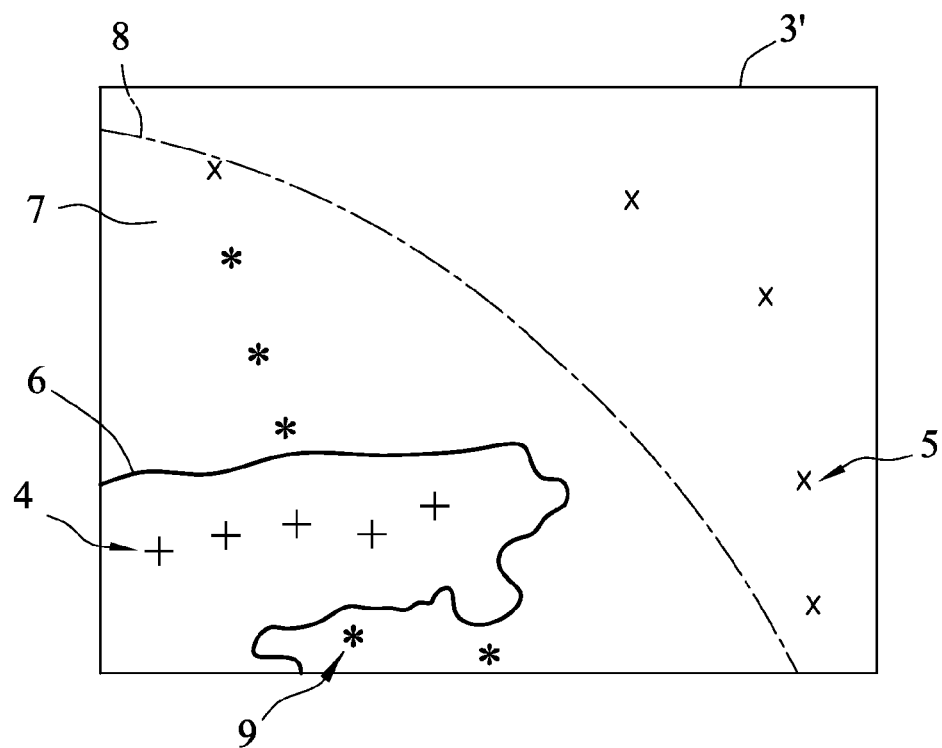
FIGS. 9 and 10 correspond to FIGS. 7 and 8, respectively, with a predetermined water level and a plurality of virtual alert points added.
Figure 10:
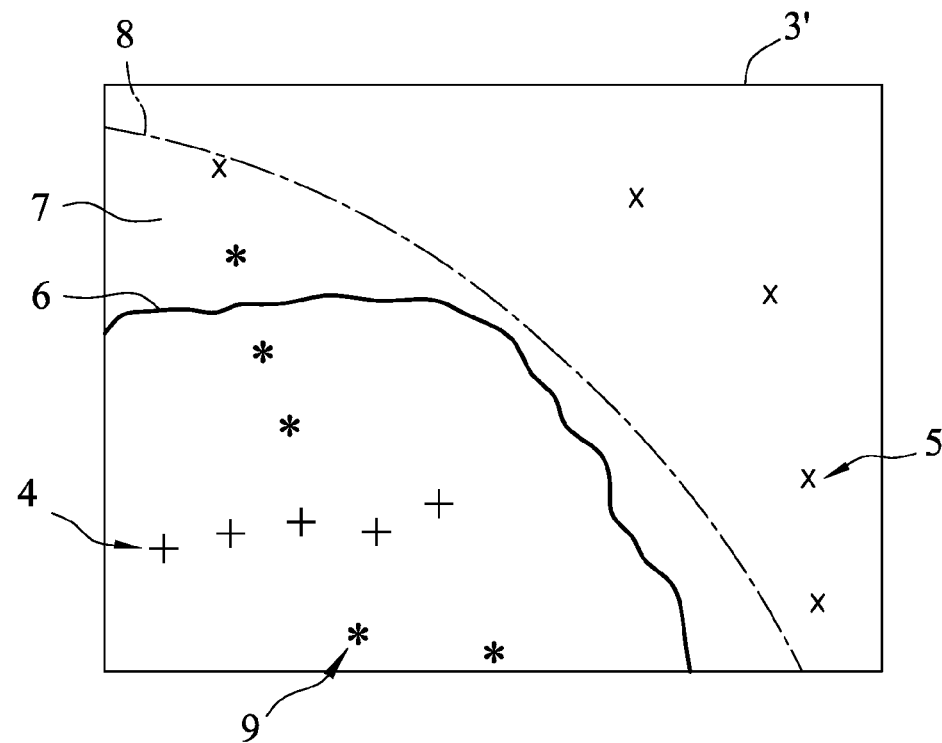

Then, in step 23, the image processing module 12 marks a plurality of virtual alert points 9 on the processed image 3' according to a predetermined water level 8 of the water body (see FIGS. 9 and 10). In this embodiment, the predetermined water level 8 is a full water level of the water body 31, and five virtual alert points 9 are marked. For example, the predetermined water level 8 may be a virtual line marked on the processed image 3' at a predetermined location indicating the full water level of the water body 31.

In step 24, the image processing module 12 is configured to determine whether each of the virtual alert points 9 is located within the water body region 6 of the processed image 3'. In this embodiment, the virtual alert points 9 represent various water levels between the full water level and a normal water level of the water body 31 (see FIG. 3), respectively, and a number of the virtual alert points 9 located within the water body region 6 is positively related to the water level of the water body 31.

For example, none of the virtual alert points 9 marked in the processed image 3' of FIG. 9 is located in the water body region 6, indicating the normal water level (or below normal water level) of the water body 31. On the other hand, four of the virtual alert points 9 marked in the processed image 3' of FIG. 10 are located in the water body region 6, indicating a higher water level of the water body 31. It is apparent that the water body region 6 of the processed image 3' of FIG. 10 is significantly larger than that of the processed image 3' of FIG. 9.

In this embodiment, the image processing module 12 further calculates a danger index based on the number of the virtual alert points 9 located within the water body region 6 of the processed image 3'. For example, the danger index may be calculated as (K/N)*100%, where K is the number of the virtual alert points 9 located within the water body region 6, and N is a total number of the virtual alert points 9. That is, the danger index is expressed as a percentage of all the virtual alert points 9 located within the water body region 6.

In step 25, the image processing module 12 determines whether the danger index is greater than or equal to a predetermined value. When the danger index is greater than or equal to the predetermined value, it is implied that the water level of the water body 31 is too high.

In such a case, in step 26, the image processing module 12 generates a warning signal. Then, the image processing module 12 transmits the monitoring result and the warning signal to the output module 13. The output module 13 is configured to process the warning signal and generate an alert signal, which is in the form of a voice signal, a graphical signal, a text message, or combinations thereof. The alert signal is subsequently transmitted to the display unit 14 and/or the audio output unit 15 for output.

It is noted that in the cases where the danger index is lower than the predetermined value, no warning signal is generated, and in turn no alert signal is outputted and the flow goes back to step 21 to continue with the monitoring.

In this case, the output module 13 may transmit the monitoring result to the display unit 14 and/or the audio output unit 15, and thus, the display unit 14 and/or the audio output unit 15 may indicate the water level of the water body 31 according to the monitoring result.

For example, it is assumed that a predetermined value of 80% is imposed. When the processed image 3' is one as shown in FIG. 9, the calculated danger index is equal to 0, and the image processing module 12 does not generate the warning signal. On the other hand, the processed image 3' as shown in FIG. 10 causes the image processing module 12 to generate the warning signal, as four of five virtual alert points 9 are located within the water body region 6 (the calculated danger index is equal to 80%).

To sum up, in the method of this invention, the monitoring system 1 is configured to utilize the image processing module 12 to process the current image 3 captured by the image capturing module 11, and to determine whether the water level of the water body 31 is too high by counting the number of the virtual alert points 9 that are located within the water body region 6. In other words, the embodiment of this invention provides a relatively simple and accurate way to monitor the water level of the water body 31.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for monitoring water level of a water body, said method to be implemented using a monitoring system that includes an image capturing module and an image processing module, said method comprising the following steps of:

(a) capturing, using the image capturing module, a current image that has a portion of the water body and a remaining portion aside from the portion of the water body;

(b) processing, by the image processing module, the current image into a processed image that includes a water body region corresponding to the portion of the water body, and a background region corresponding to the remaining portion of the current image;

(c) marking on the processed image, by the image processing module, a plurality of virtual alert points according to a predetermined water level of the water body;

(d) determining, by the image processing module, whether at least one of the virtual alert points is located within the water body region of the processed image; and (e) generating, by the image processing module, a monitoring result according to the determination made in step (d).

2. The method of claim 1, wherein, in step (b), the image processing module processes the current image into the processed image using region growing.

3. The method of claim 1, wherein the predetermined water level is a full water level of the water body, and the virtual alert points represent various water levels between the full water level and a normal water level of the water body, respectively.

4. The method of claim 3, further comprising, between steps (d) and (e), the step of calculating a danger index based on a number of the virtual alert points that are located within the water body region of the processed image, wherein, in step (e), the image processing module further generates a warning signal when the danger index is greater than or equal to a predetermined value.

5. The method of claim 4, wherein the danger index is calculated as (K/N)*100%, where K is the number of the virtual alert points that are located within the water body region, and N is a total number of the virtual alert points marked in step (c).

6. A monitoring system for monitoring water level of a water body, said monitoring system comprising:

an image capturing module for capturing a current image, the current image having a portion of the water body and a remaining portion aside from the portion of the water body; and an image processing module coupled to said image capturing module and configured to process the current image into a processed image that includes a water body region corresponding to the portion of the water body, and a background region corresponding to the remaining portion of the current image, mark, on the processed image, a plurality of virtual alert points according to a predetermined water level of the water body, determine whether at least one of the virtual alert points is located within the water body region of the processed image, and generate a monitoring result according to the determination thus made.

7. The monitoring system of claim 6, wherein said image processing module processes the current image into the processed image using region growing.

8. The monitoring system of claim 6, wherein the predetermined water level is a full water level of the water body, and the virtual alert points represent various water levels between the full water level and a normal water level of the water body, respectively.

9. The monitoring system of claim 8, wherein said image processing module further calculates a danger index based on a number of the virtual alert points that are located within the water body region of the processed image, and further generates a warning signal when the danger index is greater than or equal to a predetermined value.

10. The monitoring system of claim 9, wherein the danger index is calculated as (K/N)*100%, where K is the number of the virtual alert points that are located within the water body region, and N is a total number of the virtual alert points marked on the processed image.

11. The monitoring system of claim 9, further comprising an output module coupled to said image processing module for receiving the monitoring result and the warning signal therefrom.

12. The monitoring system of claim 11, wherein said output module is configured to process the warning signal and to generate an alert signal, which is in the form of at least one of a voice signal, a graphical signal and a text message.

13. The monitoring system of claim 12, further comprising at least one of a display unit and an audio output unit coupled to said output module for outputting the alert signal.

\* \* \* \* \*